Patented Feb. 22, 1944

2,342,612

UNITED STATES PATENT OFFICE 2,342,612

ACYLATION OF LACTONITRILE

Virgil L. Hansley, Niagara Falls, N. Y., assignor to E. I. du Pont de Nemours & Company, Wilmington, Del., a corporation of Delaware No Drawing. Application April 19, 1941, Serial No. 389,359

4 Claims. (Cl. 260—464)

This invention relates to a process for the acylation of organic compounds and particularly to a process for the acylation of certain secondary alcohols which utilizes vinyl esters as acylating agents.

The prior art discloses no method for utilizing vinyl esters as acylating agents in the acylation of the substituted secondary alcohols with which the present invention is concerned.

One of the objects of this invention is to provide a new and improved method for the acylation of certain secondary alcohols. Another object is to provide a practical and economical method for the acylation of these secondary alcohols by which good yields of the desired ester may be obtained. A further object is to provide a method for the acylation of certain secondary alcohols which is simple to operate and which may be carried out at comparatively low temperatures in easily obtainable equipment. These and other objects will be apparent from the ensuing description of my invention.

The above objects are attained in accordance with my invention by reacting a vinyl ester with certain secondary alcohols in the presence of a tertiary amine which is sufficiently alkaline to maintain a pH greater than 7.0 in the reaction medium.

I have found that when a vinyl ester, for example, vinyl acetate, is added to certain secondary alcohols in the presence of such tertiary amines, the reaction is smooth, rapid, and substantially complete and the desired ester is readily obtained in good yield.

The tertiary amines which I have found effective as catalysts for the reaction between the secondary alcohols and vinyl esters are those tertiary amines which are sufficiently alkaline to produce an alkaline reaction medium. Illustrative of the tertiary amines which are satisfactory as catalysts in the process of my invention are triethylamine and tributylamine. I have discovered that when such tertiary amines are added to a mixture containing a vinyl ester and certain secondary alcohols, in amounts sufficient to maintain a pH greater than 7.0, good yields of the desired ester are obtained. When the pH of the reaction medium is maintained considerably above 7.0, for instance, 8.0 to 9.0 or higher, the reaction may be very rapid and in some cases violent. At a pH of 7.0 or less little or no reaction occurs and I have discovered that it is essential that sufficient tertiary amine be utilized to maintain the pH of the reaction medium somewhat above 7.0 in order to obtain appreciable quantities of the desired ester by the process of my invention. I prefer to maintain a pH of 7.5 to 9.0 since I have found that in general the best results are obtained within this range.

However, the pH of the reaction medium may be maintained above 9.0 by means of the tertiary amine catalyst with satisfactory results, and in certain cases, for example when utilizing secondary alcohols which react comparatively slowly with the vinyl ester such procedure may be desirable.

The rate of reaction may be controlled by the rate of addition of tertiary amine catalyst or one of the reactants and cooling or heating the reaction mixture. While the reaction with some secondary alcohols is rapid and strongly exothermic, with others the reaction is slower and in some instances a longer time or higher temperature or a combination of these conditions may be utilized to insure complete reaction. For instance, in some cases it has proven desirable to permit the reaction mixture to stand at room temperature for a few days or to reflux the mixture in order to insure complete reaction.

The particular tertiary amine which is most suitable for use in carrying out a specified acylation according to my invention may depend upon the boiling points of the materials involved in the reaction. Generally, it is preferable to utilize a tertiary amine which may easily be separated from the reaction mixture by distillation in order to simplify recovery of the desired product in pure form.

It is generally preferable that the tertiary amine catalyst used in the process of my invention be substantially anhydrous since the presence of water in the reaction may result in a loss of the desired product due to hydrolysis.

The process of my invention may be carried out at any desired temperature compatible with the particular reactants used and the product obtained. Generally, I have found it desirable to operate my process at about room temperature and in some cases as high as 80° C. to 100° C. In some instances it may be preferable to reflux the reaction mixture to insure complete reaction.

I am aware of the fact that it has been proposed to utilize acid catalysts for the acylation of primary alcohols but I have found that acidic catalysts are ineffective for the acylation of the substituted secondary alcohols with which the present invention is concerned.

The secondary alcohols which are within the scope of my invention are those compounds represented by the formula

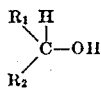

wherein $R_2$ is selected from the group consisting of halo-methyl, cyano, cyano-methyl, aldo-methyl, hydroxy-methyl, alkoxy-methyl, aryl-oxy-methyl, acyloxy-methyl, ester, and 2-oxy-2 cyano-ethyl radicals, and $R_1$ is selected from the group consisting of alkyl, aryl, hydro-aromatic, hydroxyl-alkyl, and radicals identical with $R_2$.

Throughout the claims the substituent radicals of the secondary alcoholic compounds which are operable in the process of my invention are defined as follows: halo-methyl designates the radicals, —$CH_2X$ in which X may be chlorine, bromine, or iodine; the cyano radical, —CN; cyano - methyl, —$CH_2CN$; hydroxy - methyl, —$CH_2OH$; ester, —COOY and acyloxy-methyl, —$CH_2OOCY$, in which Y is an alkyl or aryl radical; aldo-methyl, —$CH_2CHO$; alkoxy or aryloxy methyl, —$CH_2OY$ in which Y is an alkyl or aryl radical; 2-oxy 2-cyano ethyl,

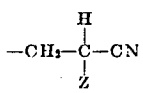

in which Z is an oxy radical; and hydro-aromatic is a cyclo-paraffin radical such as cyclohexyl.

Illustrative of the secondary alcohols which I have observed to acylate readily in accordance with the process of my invention are methyl lactate, aldol, glycerol, diacetin, aldol cyanhydrin, lactonitrile, glycerol alpha-gamma-dichlorohydrin. Compounds such as aceto-acetic ester and beta-cyano beta-acetoxy-ethyl methyl carbinol are also operative in the process of my invention.

The following procedure illustrates a satisfactory method of carrying out the process of my invention. The secondary alcohol to be acylated is placed in a suitable reaction vessel. For carrying out the process on a small scale a three-necked flask equipped with a stirrer and inlet for vinyl ester may conveniently be used. The reaction flask is immersed in a bath arranged for heating or cooling and sufficient tertiary amine is added to the compound to be acylated to maintain an alkaline reaction medium. The vinyl ester is added gradually to the contents of the flask while the reaction mixture is agitated. The rate of addition of vinyl ester and the rate of cooling or heating are adjusted so as to maintain the desired reaction temperature. The reaction in most instances is rapid and is substantially complete by the time the vinyl ester has been added. When the reaction is completed the product may be isolated by distillation. The alkali may be neutralized before distillation to avoid hydrolysis.

The following examples illustrate the process of my invention:

Example 1

Ninety grams of vinyl acetate were added to a mixture of 104 grams of methyl lactate and 19 grams of triethylamine. The mixture was allowed to stand at room temperature for five days. Upon vacuum distillation 82 grams of methyl alpha-acetoxy propionate were obtained, boiling point 75–76° C. at 20 mm. pressure. The yield was 56% of the theoretical, based on the amount of methyl lactate used.

Example 2

Eighty-six grams of vinyl acetate were added in small portions to a mixture of 71 grams of lactonitrile and 5 grams of triethylamine. The vigorous reaction was controlled by the use of an ice bath. After all the vinyl acetate had been added, the mixture was distilled at reduced pressure. One hundred grams of lactonitrile acetate were obtained, boiling point 73° C. at 19 mm. pressure. The yield was 88.5% of the theoretical, based on the amount of lactonitrile used.

Example 3

Ninety grams of vinyl acetate were added to a mixture of 176 grams of diacetin and 15 grams of triethylamine. The mixture was allowed to stand at room temperature for five days, and after neutralization with phosphoric acid, the sample was distilled at 5 mm. pressure. The portion of distillate which came over at 128–129° C. was washed once with 100 ml. of water, then re-distilled at reduced pressure. One hundred thirty-six grams of triacetin were obtained, a yield of 62%, based on the quantity of diacetin used. The boiling point was 154° C. at 22 mm. pressure.

Example 4

Eighty-six grams of vinyl acetate were added in small portions to a mixture of 129 grams of glycerol alpha-gamma-dichlorohydrin and 24 grams of triethylamine. Within half an hour after mixing, a fairly vigorous exothermic reaction took place. The mixture was then refluxed for fifteen minutes. After being cooled and neutralized with phosphoric acid, the sample was distilled at 20 mm. pressure. The fraction boiling above 80° C. was re-distilled at 10 mm., and 150 grams of the acetate of glycerol alpha-gamma-dichlorohydrin were obtained, an 88% yield, based on the amount of dichlorohydrin used. The boiling point of the ester was 77° C. at 10 mm. pressure.

Example 5

Forty-eight and five-tenths grams (48.5) of vinyl formate were added in small portions to a mixture of 42.6 grams of lactonitrile and 3.0 grams of triethylamine. The temperature was kept at 40–45° C. by cooling the reaction flask in an ice bath. After all the vinyl formate had been added the reaction mixture was refluxed for fifteen minutes, cooled, and neutralized with phosphoric acid. By vacuum distillation 55 grams of lactonitrile formate, boiling point 64° C. at 19 mm., were obtained. The yield was 92% of the theoretical, based on the amount of lactonitrile used.

Example 6

Twenty-six and seven-tenths grams (26.7) of vinyl propionate were added in small portions to a mixture of 14.2 grams of lactonitrile and 1.0 grams of triethylamine. A fairly vigorous exothermic reaction occurred at once. After neutralization with phosphoric acid, the sample was vacuum distilled, and 22 grams of lactonitrile propionate, boiling at 57–58° C. at 5 mm. pressure, were obtained. The yield was 87% of the theoretical, based on the quantity of lactonitrile employed.

Example 7

Ten grams of tri-n-butylamine were added dropwise to a mixture of 190 grams of lactonitrile and 260 grams of vinyl acetate. A vigorous reaction occurred, which was controlled by the use of an ice bath. The mixture was then neutralized with phosphoric acid. Upon distilling at 20 mm. pressure, 283 grams of lactonitrile acetate were obtained, a 94% yield, on the basis of the quantity of lactonitrile used.

In general, I prefer to use approximately equimolecular proportions of secondary alcohol and vinyl ester since the reaction is substantially complete and an excess of either reactant is not required. However, in some instances it may be found desirable to use an excess of one of the reactants. For example, such an excess may be utilized as a solvent for the reaction mixture.

Many modifications of my invention may be made without departing from the scope thereof. My process may be carried out as a batch or as a continuous process. Moreover, the reaction may be carried out in the presence of solvents inert with respect to the reactants and catalyst employed. Also the products may be recovered by means other than distillation. For example, the acetaldehyde formed may be removed by adding an agent which will react with the acetaldehyde to form a compound capable of being removed by mechanical means. Vinyl esters other than vinyl acetate, for instance vinyl formate, vinyl propionate or vinyl butyrate may be utilized as the acylating agent. Many other modifications will be apparent to those skilled in the art without departing from the scope of this invention, the essential feature of which comprises a process for the acylation of certain secondary alcohols by reacting said alcohols with a vinyl ester in the presence of a tertiary amine which is sufficiently alkaline to maintain a pH greater than 7.0 in the reaction medium and maintaining the pH of the reaction mixture above 7.0 by means of said tertiary amine.

The process of my invention is useful in the preparation of a wide variety of esters which may be used as solvents or for the synthesis of other compounds.

The process of my invention possesses many advantages which will be apparent to those skilled in the art. The process is simple and easily operated on any desired scale, high yields of the desired esters are obtained and the product is easily isolated in pure form. Furthermore, the use of a tertiary amine as a catalyst avoids the necessity for corrosion resistant equipment such as is required by a process which utilizes acidic materials. A further important advantage resides in the fact that the process of my invention may be operated efficiently at comparatively low temperatures thus avoiding undesirable side reactions and consequent loss in yield which occur at high temperatures. The process of my invention is valuable for the preparation of esters of certain secondary alcoholic compounds since no previous method which utilizes vinyl esters for the acylation of these compounds is known.

I claim:

1. The process for the acylation of lactonitrile which comprises reacting a vinyl ester with lactonitrile in the presence of a tertiary amine of suitable alkalinity and maintaining the pH of the reaction mixture above 7.0 by means of said tertiary amine.

2. The process for the acetylation of lactonitrile which comprises reacting vinyl acetate with lactonitrile in the presence of triethyl amine and maintaining the pH of the reaction mixture above 7.0 by means of said triethylamine.

3. The process for the acylation of lactonitrile which comprises reacting a vinyl ester with lactonitrile in the presence of tributylamine and maintaining the pH of the reaction mixture above 7.0 by means of said tributylamine.

4. The process for the acetylation of lactonitrile which comprises reacting vinyl acetate with lactonitrile in the presence of tributylamine and maintaining the pH of the reaction mixture above 7.0 by means of said tributylamine.

VIRGIL L. HANSLEY.